US009129493B2

(12) United States Patent
St. George et al.

(10) Patent No.: US 9,129,493 B2
(45) Date of Patent: Sep. 8, 2015

(54) WIRELESS DEVICE OPERABLE CASH DRAWER HAVING BIOMETRIC, DATABASE, AND MESSAGING CAPABILITIES

(75) Inventors: Paul St. George, Vadnais Heights, MN (US); Patrick Vue, Brooklyn Park, MN (US)

(73) Assignee: APG CASH DRAWER, LLC, Minneapolis, MN (US)

( * ) Notice: Subject to any disclaimer, the term of this patent is extended or adjusted under 35 U.S.C. 154(b) by 0 days.

(21) Appl. No.: 13/472,907

(22) Filed: May 16, 2012

(65) Prior Publication Data

US 2012/0233006 A1 Sep. 13, 2012

Related U.S. Application Data

(63) Continuation-in-part of application No. 13/299,744, filed on Nov. 18, 2011, now Pat. No. 8,928,456, which is a continuation-in-part of application No. 12/983,493, filed on Jan. 3, 2011.

(60) Provisional application No. 61/293,378, filed on Jan. 8, 2010.

(51) Int. Cl.

| | |
|---|---|
| ***G05B 19/00*** | (2006.01) |
| ***G05B 23/00*** | (2006.01) |
| ***B60R 25/00*** | (2013.01) |
| ***G07G 1/00*** | (2006.01) |
| ***G07G 1/14*** | (2006.01) |

(52) U.S. Cl.

CPC .............. *G07G 1/0018* (2013.01); *G07G 1/009* (2013.01); *G07G 1/0081* (2013.01); *G07G 1/14* (2013.01)

(58) Field of Classification Search

CPC ...................................................... G06F 17/60
USPC ........................................... 340/5.2; 700/237
See application file for complete search history.

(56) References Cited

U.S. PATENT DOCUMENTS 3,899,775 A 8/1975 Larsen
4,101,745 A 7/1978 Smith
4,255,697 A 3/1981 Buhler, III (Continued)

FOREIGN PATENT DOCUMENTS

KR 10-2010-0027839 A 3/2010
KR 10-2010-0061628 A 6/2010

OTHER PUBLICATIONS

Star DK-AirCash Accessory, accessed Jul. 18, 2013. 2 pages.

(Continued)

*Primary Examiner* — Kerri McNally
*Assistant Examiner* — Pameshanand Mahase
(74) *Attorney, Agent, or Firm* — Katherine M. Scholz; Kelly, Holt & Christenson, PLLC

(57) ABSTRACT

Cash drawers that are operated by wireless devices are disclosed. In one embodiment, a cash drawer includes a network interface and a controller. The network interface enables the cash drawer to communicate with one or more wireless devices. The controller optionally controls access of the one or more wireless devices to the cash drawer based on a collection of biometric information. The collection of biometric information may be collected by the cash drawer, by the one or more wireless devices, or by an input device that is communicatively coupled to the one or more wireless devices. The collection of biometric information is illustratively used to verify an identity of a user.

21 Claims, 17 Drawing Sheets

(56) References Cited

U.S. PATENT DOCUMENTS

| | | | | |
|---|---|---|---|---|
| RE32,456 | E | 7/1987 | Ishii | |
| 4,829,429 | A | 5/1989 | Komai et al. | |
| 5,983,202 | A | 11/1999 | Yabe et al. | |
| 6,056,087 | A | 5/2000 | Addy et al. | |
| 6,072,894 | A * | 6/2000 | Payne | 382/118 |
| 6,626,354 | B1 | 9/2003 | Baitz et al. | |
| 6,629,019 | B2 * | 9/2003 | Legge et al. | 700/237 |
| 6,739,501 | B2 | 5/2004 | Murakami et al. | |
| 6,792,394 | B1 | 9/2004 | Matsko et al. | |
| 6,965,294 | B1 * | 11/2005 | Elliott et al. | 340/5.2 |
| 6,967,579 | B1 | 11/2005 | Elizondo | |
| 6,983,836 | B2 | 1/2006 | Adams et al. | |
| 7,158,026 | B2 * | 1/2007 | Feldkamp et al. | 340/531 |
| 7,254,625 | B2 | 8/2007 | Gluska et al. | |
| 7,360,685 | B2 | 4/2008 | Keohane et al. | |
| 7,366,681 | B2 | 4/2008 | Carter | |
| 7,474,330 | B2 | 1/2009 | Wren et al. | |
| 7,677,440 | B2 | 3/2010 | Crockett et al. | |
| 7,686,216 | B2 * | 3/2010 | Walczyk et al. | 235/383 |
| 7,784,684 | B2 | 8/2010 | Labrou et al. | |
| 7,847,675 | B1 * | 12/2010 | Thyen et al. | 340/5.2 |
| 7,850,076 | B1 | 12/2010 | Dorenbaum | |
| 7,917,769 | B2 * | 3/2011 | Campisi | 713/186 |
| 8,025,214 | B1 | 9/2011 | Folk et al. | |
| 8,313,020 | B2 | 11/2012 | Ramachandran | |
| 2002/0020743 | A1 | 2/2002 | Sugukawa et al. | |
| 2002/0172190 | A1 | 11/2002 | Vatanen | |
| 2003/0065566 | A1 | 4/2003 | Kodaka | |
| 2003/0120920 | A1 | 6/2003 | Svensson | |
| 2004/0111360 | A1 * | 6/2004 | Albanese | 705/38 |
| 2005/0229016 | A1 | 10/2005 | Addy | |
| 2005/0242176 | A1 | 11/2005 | Roberge et al. | |
| 2005/0283403 | A1 | 12/2005 | Ramirez et al. | |
| 2006/0031503 | A1 * | 2/2006 | Gilbert | 709/225 |
| 2009/0050684 | A1 | 2/2009 | Crockett et al. | |
| 2010/0001063 | A1 | 1/2010 | Bowles et al. | |
| 2010/0010901 | A1 | 1/2010 | Marshall et al. | |
| 2010/0057813 | A1 * | 3/2010 | Abe et al. | 707/781 |
| 2011/0172960 | A1 | 7/2011 | St. George et al. | |
| 2012/0062363 | A1 | 3/2012 | St. George et al. | |
| 2013/0072115 | A1 | 3/2013 | Dobyns | |
| 2013/0346027 | A1 | 12/2013 | St. George et al. | |

OTHER PUBLICATIONS

Annette Langley "Looking to open your cash drawer with a Tablet or Smartphone? Star has the answer . . . " accessed Jul. 18, 2013. 2 pages.

Prosecution History from U.S. Appl. No. 12/983,493 including; Application and Drawings filed Jan. 3, 2011, Non-Final Rejection dated Oct. 10, 2012, Amendment filed Apr. 10, 2013, Final Rejection dated May 8, 2013, Amendment with RCE filed Jul. 26, 2013, Non-Final Rejection dated Aug. 29, 2013 and Amendment filed Feb. 14, 2014.

Prosecution History from U.S. Appl. No. 13/299,744; including Application and Drawings filed Nov. 18, 2011, Final Rejection dated Jul. 23, 2013, Amendment filed Dec. 13, 2013, Final Rejection dated Feb. 25, 2014, Amendment with RCE filed Mar. 21, 2014, and Non-Final Rejection dated Apr. 14, 2014. 79 pages.

Prosecution History from U.S. Appl. No. 14/010,126 including;Application and Drawings filed Aug. 26, 2013, Non-Final Rejection dated Feb. 12, 2014, and Amendment filed May 12, 2014. 54 pages.

Prosecution History from U.S. Appl. No. 12/983,493; Final Rejection dated May 23rd, 2014, and Amendment with RCE dated Aug. 25, 2014. 40 pages.

Prosecution History from U.S. Appl. No. 13/299,744; Amendment dated Jul. 1, 2014, and Notice of Allowance dated Aug. 22, 2014. 20 pages.

Prosecution History from U.S. Appl. No. 14/010,126 including: Final Rejection dated May 30, 2014, Amendment after Final dated Jul. 7, 2014, and Advisory Action dated Jul. 10, 2014. 34 pages.

Prosecution History from U.S. Appl. No. 13/299,744; Notice of Allowance dated Oct. 29, 2014. 8 pages.

International Search Report and Written Opinion for International Application No. PCT/US2014/052541, date of mailing. Dec. 3, 2014, date of filing: Aug. 25, 2014. 13 pages.

Prosecution History for U.S. Appl. No. 14/010,126 including: Amendment with RCE dated Nov. 14, 2014, 10 pages.

Non-Final Office Action from U.S. Appl. No. 12/983,493 dated Jan. 28, 2015, 28 pages.

Non-Final Office Action from U.S. Appl. No. 14/010,126 dated Feb. 13, 2015, 18 pages.

* cited by examiner

| 904 | 906 | 908 | 910 | 912 |
|---|---|---|---|---|
| 10272011 | 11:28:51 | 60 | 00 | WD 1 |
| 10272011 | 12:02:57 | 12 | 22 | WD 1 |
| 10272011 | 12:25:52 | 18 | 25 | WD 1 |
| 10272011 | 12:28:53 | 50 | 00 | WD 2 |
| 10272011 | 12:38:45 | 41 | 00 | WD 1 |
| 10272011 | 12:48:51 | 40 | 33 | WD 4 |
| 10272011 | 12:58:51 | 31 | 00 | WD 1 |

*Fig. 9*

WIRELESS DEVICE OPERABLE CASH DRAWER HAVING BIOMETRIC, DATABASE, AND MESSAGING CAPABILITIES

REFERENCE TO RELATED CASES

The present application is a continuation-in-part application that is based on and claims the priority of non-provisional application Ser. No. 13/299,744 filed on Nov. 18, 2011, which is based on and claims the priority of non-provisional application Ser. No. 12/983,493 filed on Jan. 3, 2011, which is based on and claims the priority of provisional application Ser. No. 61/293,378 filed on Jan. 8, 2010, the contents of which are hereby incorporated by reference in their entirety.

BACKGROUND

Cash drawers are commonly employed at point-of-sale (POS) locations such as retail businesses. Cash drawers are used to securely store currency, credit card receipts, and the like until a financial transaction occurs, at which time the drawer is opened to access the contents. Normally such cash drawers are spring-loaded and are opened by energizing a solenoid to release a latch. In a common mode of operation, opening of a cash drawer is initiated from a POS terminal.

SUMMARY

An aspect of the disclosure relates to cash drawers that are operated by wireless devices. In one embodiment, a cash drawer includes a network interface and a controller. The network interface enables the cash drawer to communicate with one or more wireless devices. The controller optionally controls access to the cash drawer based on a collection of biometric information. The collection of biometric information may be collected by the cash drawer, by the one or more wireless devices, or by an input device that is communicatively coupled to the one or more wireless devices. The collection of biometric information is illustratively used to verify an identity of a user.

In another embodiment, a cash drawer includes a network interface that enables the cash drawer to communicate with a network, and a controller that enables the cash drawer to send messages to devices utilizing the network. In some illustrative embodiments, a cash drawer sends messages to turn on a camera, to alert a loss prevention team, or to alert a manager. The cash drawer may also have capabilities that enable remote troubleshooting of the device. Additionally, the cash drawer may be configured to receive inputs from another device such as, but not limited to, a Bluetooth scanner.

In yet another embodiment, a method includes communicatively coupling a cash drawer to a network, and storing indications of transactions associated with the cash drawer to a database. The cash drawer may create and store an event log to the database that includes information identifying transactions between the wireless device and the cash drawer. The database and/or event log may be utilized to determine how many times the cash drawer has been opened, to determine time and date stamps of transactions, to determine a store layout, to determine whether or not a cash drawer should be serviced, and to determine where on a video a specific event (e.g. a cash drawer being opened by a key) can be found.

These and various other features and advantages that characterize the claimed embodiments will become apparent upon reading the following detailed description and upon reviewing the associated drawings.

BRIEF DESCRIPTION OF THE DRAWINGS

FIG. 9 is an illustration of an event log.

DETAILED DESCRIPTION

Embodiments of the present disclosure include cash drawers that are operable by a wireless device. In some embodiments, multiple cash drawers and wireless devices are communicatively coupled through a network (e.g. an Ethernet network), and each cash drawer and wireless device is optionally a separate device or node on the network that has its own IP address. In such a case, a wireless device is able to selectively connect to a particular cash drawer on the network. For instance, in one embodiment, for illustration purposes only and not by limitation, each cash drawer on a network has a barcode, and a wireless device reads the barcode of one of the cash drawers to become communicatively coupled to that cash drawer. In another embodiment, again for illustration purposes only, cash drawers and wireless devices utilize other technologies such as, but not limited to, radio frequency identification (RFID), near field communication (NFC) technologies, and/or biometrics to selectively couple a wireless device to a cash drawer. Several examples of such systems are described in further detail below. These cash drawers may be advantageous in that they provide mobile point-of-sale (POS) systems and low cost cash management solutions. For instance, instead of a retailer or other POS system user being constrained to fixed location POS systems, POS users can use mobile devices to operate their cash drawers. This may provide flexibility for example in the manner in which retailers interact with customers and also provide flexibility in setting-up a store layout. These and other possible advantages are discussed in greater detail below.

Figure 1:
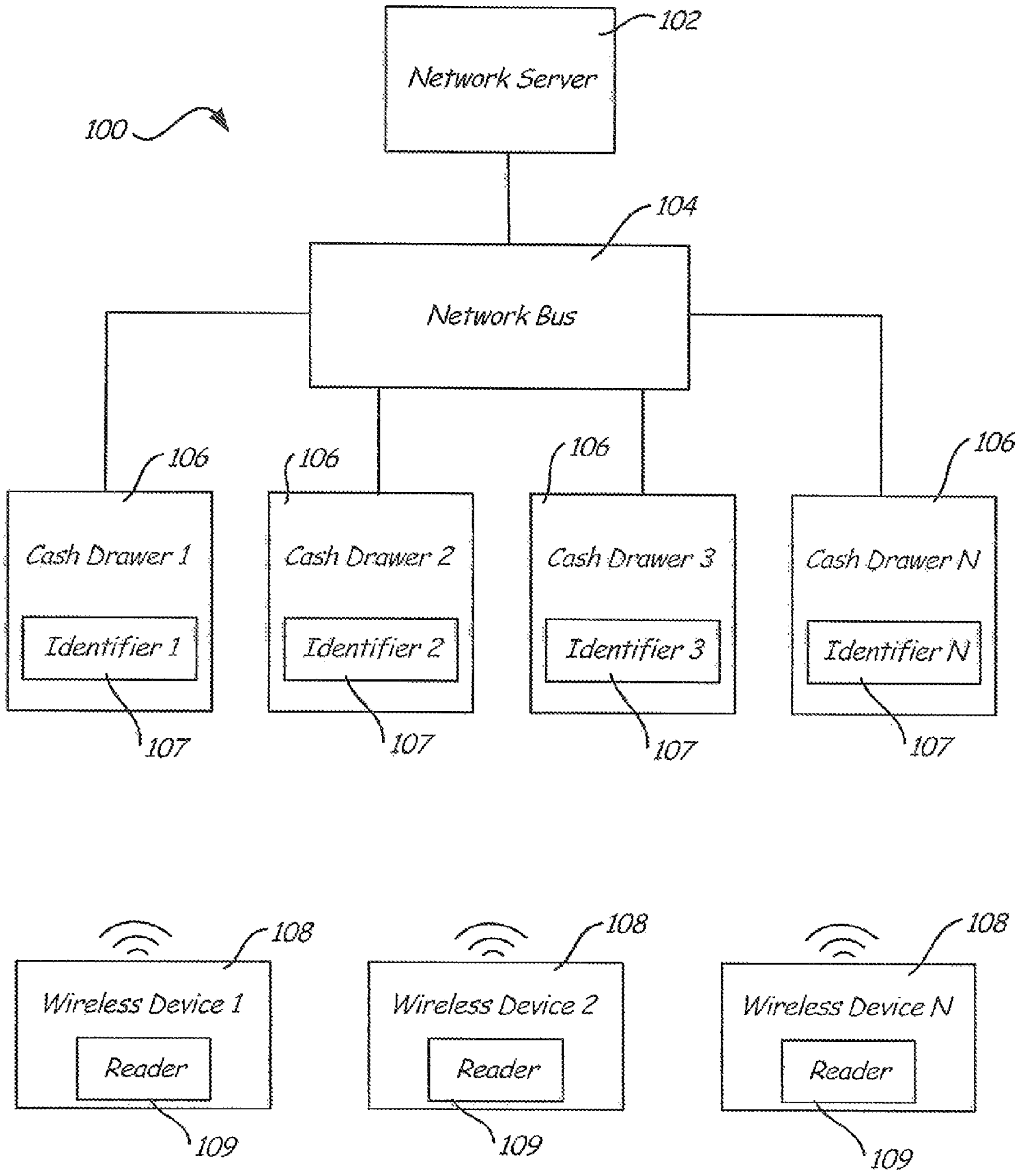
FIG. 1 is a block diagram of a network having cash drawers with identifiers and wireless devices with readers.

FIG. 1 shows one illustrative operating environment in which wireless device operable cash drawers may be incorporated in. Embodiments are not however limited to any particular environment and may be practiced in environments different than the one shown in FIG. 1. In FIG. 1, a network 100 includes a server 102, a network bus (e.g. an Ethernet bus)

104, one or more cash drawers 106, and one or more wired or wireless devices 108. Each cash drawer 106 and wireless device 108 illustratively acts as a node on the network as a free-standing network device having its own IP address. In other words, the cash drawers and wireless devices are not simply devices that are physical peripherals to a host PC. Additionally, each cash drawer 106 may be connected to the network through either a wired or a wireless connection.

In an embodiment, each cash drawer 106 illustratively has an identifier 107 that can be used to uniquely identify each cash drawer 106 in network 100, and each wireless device 108 has a reader 109 that is able to read the cash drawer identifiers 107. Identifiers 107 may include a visual identifier such as a barcode of any type that is placed on the outside of the cash drawer 106. In such a case, the wireless device readers 109 may be cameras that are able to read the barcodes. Embodiments of identifiers 107 and readers 109 are not however limited to any particular type of identifiers and readers, and can include any means of identifying and distinguishing one cash drawer 106 on network 100 from all other devices including the other cash drawers 106 on network 100.

Figure 2:
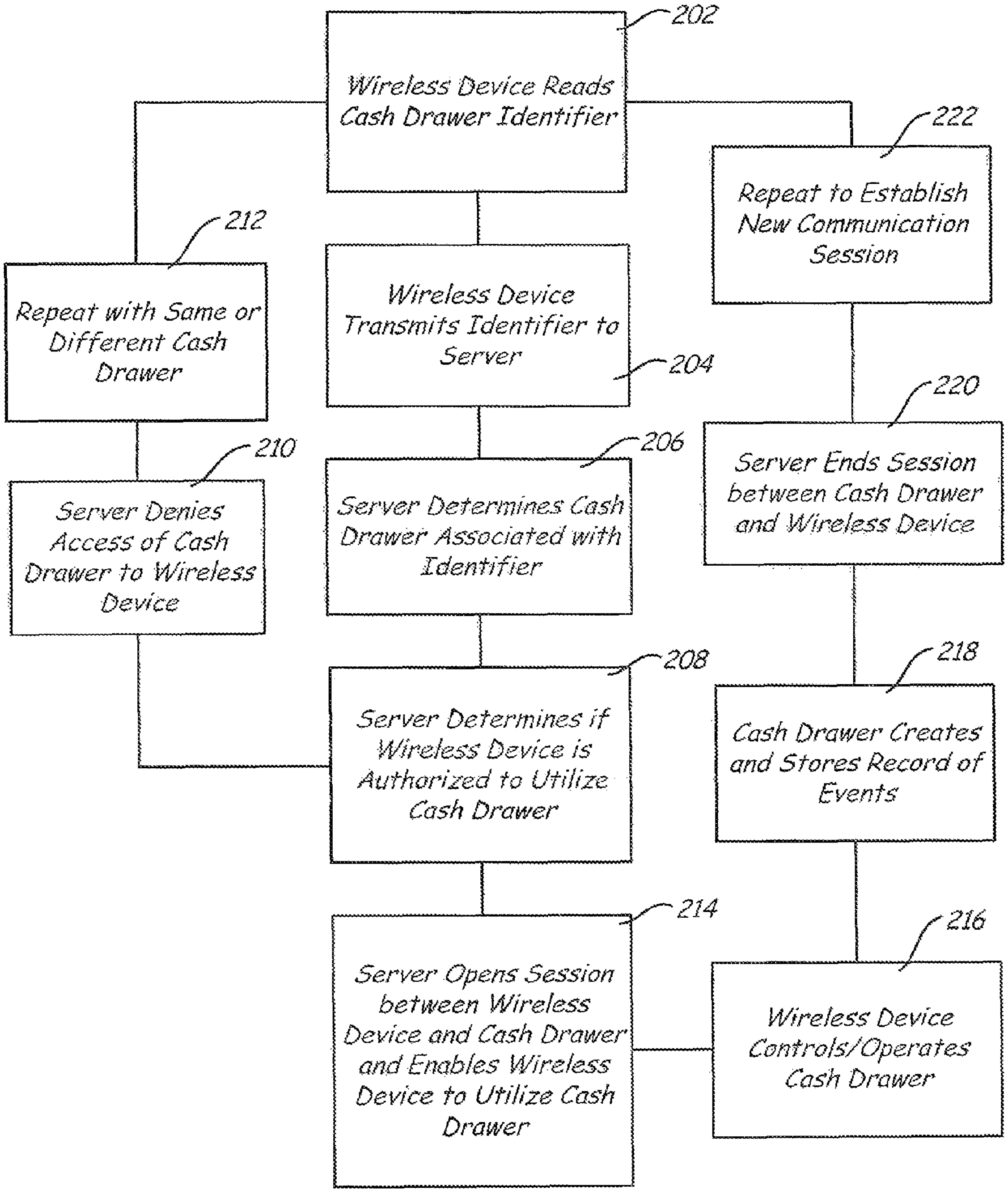
FIG. 2 is a flow chart of a method of utilizing a cash drawer identifier to enable a wireless device to operate a cash drawer.

FIG. 2 is a flow diagram illustrating one method of connecting a wireless device 108 to a cash drawer 106. At block 202, a wireless device 108 utilizes its reader 109 to read an identifier 107 on one of the cash drawers 106. The wireless device 108 then transmits the identifier information that it read to the network server 102 at block 204. At block 206, the server 102 determines which cash drawer 106 is associated with the identifier 107. For instance, server 102 may have a table or other stored information that enables it to determine which unique identifier 107 is associated with each cash drawer 106. The server 102 may also optionally include other information such as a table that identifies which wireless devices 108 are authorized to access which cash drawers 106.

At block 208, server 102 determines if the wireless device 108 is authorized to utilize the particular cash drawer 106. If the wireless device 108 is not authorized, server 102 denies access to the cash drawer 106 at block 210. The wireless device 108 may optionally repeat the process with the same or a different cash drawer 106 at block 212.

If the server 102 determines that wireless device 108 is authorized, server 102 opens a session between the wireless device 108 and cash drawer 106 at block 214 that enables the wireless device 108 to utilize the cash drawer 106. At block 216, the wireless device 108 controls/operates the cash drawer 106. In one embodiment, the cash drawer 106 creates and stores a record (e.g. an event log) of any transactions between the cash drawer 106 and the wireless device 108 at block 218. One example of such a record is shown in FIG. 9 and is described in further detail below. At block 220, server 102 ends the session between the cash drawer 106 and the wireless device 108. The session may be ended after a configurable predetermined amount of time since the session started. The session may be ended after a configurable predetermined amount of idle time (e.g. no transactions/communications between the wireless device 108 and the cash drawer 106), or the session may be ended based upon any other configurable parameter. After the session has ended, the wireless device 108 may optionally repeat the process with the same or a different cash drawer 106 at block 222.

It should be noted that the method shown in FIG. 2 enables a user of a wireless device 108 to be able to selectively choose and utilize one particular cash drawer 106 in a system 100 having multiple cash drawers 106. The user simply utilizes a reader 109 of the wireless device 108 to read the identifier 107 of the cash drawer 106 that he or she wishes to use. If the wireless device 108 is authorized to utilize the particular cash drawer 106, the network server 102 opens a session and enables the wireless device 108 to operate the cash drawer 106. Accordingly, the method shown in FIG. 2 can be useful in setting-up and managing a system 100 having multiple wireless devices 108 and cash drawers 106.

Figure 3:
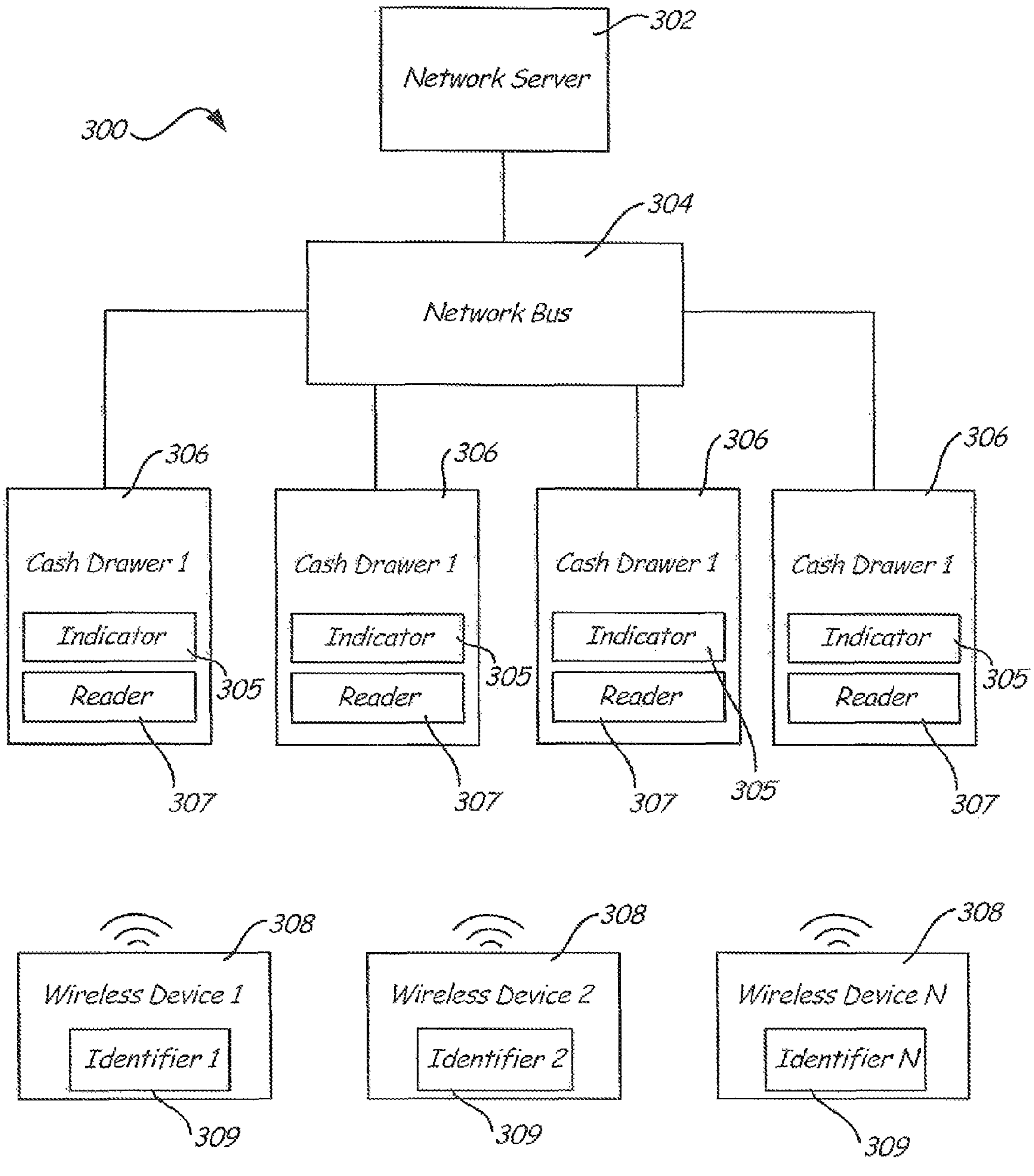
FIG. 3 is a block diagram of a network having cash drawers with readers and wireless devices with identifiers.

FIG. 3 shows another illustrative operating environment in which wireless device operable cash drawers may be incorporated in. Embodiments again are not however limited to any particular environment and may be practiced in environments different than the ones shown in FIGS. 1 and 3. In FIG. 3, a network 300 includes a server 302, a network bus (e.g. an Ethernet bus) 304, one or more cash drawers 306, and one or more wireless devices 308. Each cash drawer 306 and wireless device 308 again illustratively acts as a node on the network as a free-standing network device having its own IP address.

In an embodiment, each wireless device 308 illustratively has an identifier 309 that can be used to uniquely identify each wireless device 308 in network 300, and each cash drawer 306 has a reader 307 that is able to read the wireless device identifiers 309. Identifiers 309 may include identifiers that use any technology. In one example, for illustration purposes only and not by limitation, identifiers 309 are active or passive radio frequency identification (RFID) tags that are placed on or in wireless devices 308. In such a case, the cash drawer readers 307 may be RFID readers that are able to read the RFID tags. In another example, identifiers 309 are Near Field Communications (NFC) chips that are embedded in or programmed in wireless devices 308, and cash drawer readers 307 are NFC readers. Embodiments of identifiers 309 and readers 307 are not however limited to any particular type of identifiers and readers, and can include any technology for identifying and distinguishing one wireless device 308 on network 300 from the other wireless devices 308 on network 300.

Figure 4:
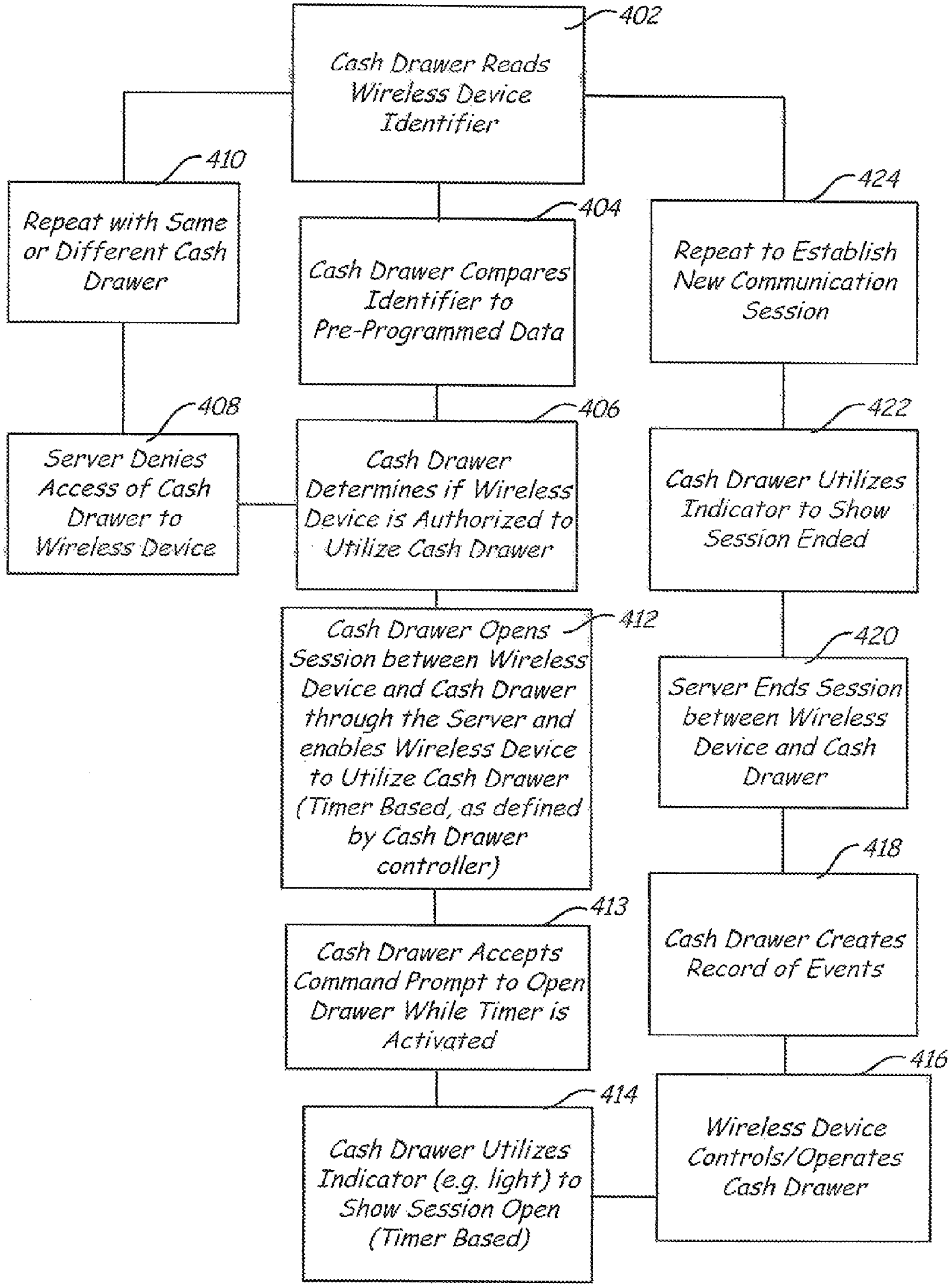
FIG. 4 is a flow chart of a method of utilizing a cash drawer reader to enable a wireless device to operate a cash drawer.

FIG. 4 is a flow diagram illustrating another method of connecting a wireless device 108 to a cash drawer 106. At block 402, a cash drawer 306 utilizes its reader 307 to read an identifier 309 of one of the wireless devices 309. In certain embodiments, such as when RFID or NFC technologies are used, a wireless device identifier 309 is read based upon its proximity to the cash drawer reader 307. For example, a reader 307 will read an RFID tag or NFC chip if it is within a certain distance of the reader 307. If multiple identifiers 309 are read at a same time, the network server 302 may optionally have a conflict resolution process such as a user interface that enables one of the two or more devices to be selected.

At block 404, the cash drawer 306 compares the identifier read at block 402 with data previously programmed into the memory of the cash drawer. The cash drawer 306 then determines which wireless device 308 is associated with the identifier 309. For instance, the cash drawer 306 may have a table or other stored information that enables it to determine which unique identifier 309 is associated with each wireless device 308. The cash drawer 306 may also optionally include other information such as a table that identifies which wireless devices 308 are authorized to access which cash drawers 306.

At block 406, the cash drawer 306 determines if the wireless device 308 is authorized to utilize the particular cash drawer 306. If the wireless device 308 is not authorized, the cash drawer 306 denies access at block 408. The wireless device 308 may optionally repeat the process with the same or a different cash drawer 306 at block 410 (e.g. a user may place the wireless device 308 in front of a different cash drawer 306).

If the cash drawer 306 determines that wireless device 308 is authorized, cash drawer 306 opens a session between the wireless device 308 and cash drawer 306 at block 412 that enables the wireless device 308 to utilize the cash drawer 306. The session at block 412 may be timer based as defined by a cash drawer controller. Then, at block 413, the cash drawer may accept a command prompt to open the drawer while a timer is activated. At block 414, the cash drawer optionally utilizes an indicator (e.g. a light) to show that a session is opened. The session may be timer based. As shown in FIG. 3, in one embodiment, each cash drawer 306 may include an indicator 305 that shows when a session is active. For example, an indicator 306 may be a light (e.g. a green LED) that is turned on to show that a wireless device 308 is able to control a cash drawer 306. Indicators 305 are not limited to any particular kind of indicator and may include any audio, visual, or other type of indicator.

At block 416, the wireless device 308 controls/operates the cash drawer 306. In one embodiment, the cash drawer 306 creates and stores a record (e.g. an event log) of any transactions between the cash drawer 306 and the wireless device 308 at block 418. At block 420, server 302 ends the session between the cash drawer 306 and the wireless device 308. The session may be ended after a configurable predetermined amount of time since the session started. The session may be ended after a configurable predetermined amount of idle time (e.g. no transactions/communications between the wireless device 308 and the cash drawer 306), or the session may be ended based upon any other configurable parameter. After the session has ended or concurrently with the session ending, the cash drawer 306 utilizes its indicator 305 to show that the session has ended at block 422. For instance, if a light was turned on at block 414, the light is illustratively turned off at block 422. Embodiments are not however limited to any particular implementation, and embodiments may utilize any type of indicator to show that a session has ended. Finally, at block 424, the wireless device 308 may optionally repeat the process with the same or a different cash drawer 306.

Similar to the method shown in FIG. 2, the method in FIG. 4 enables a user of a wireless device 308 to be able to selectively choose and utilize one particular cash drawer 306 in a system 300 having multiple cash drawers 306. The user simply places the wireless device 308 within close enough proximity to the reader 307 of a cash drawer 306, such that the reader 307 can read the wireless device identifier 309. If the wireless device is authorized to utilize the particular cash drawer 306, the network server 302 opens a session and enables the wireless device 308 to operate the cash drawer 306. Accordingly, the method shown in FIG. 4 can be useful in setting-up and managing a system 300 having multiple wireless devices 308 and cash drawers 306.

Figure 5:
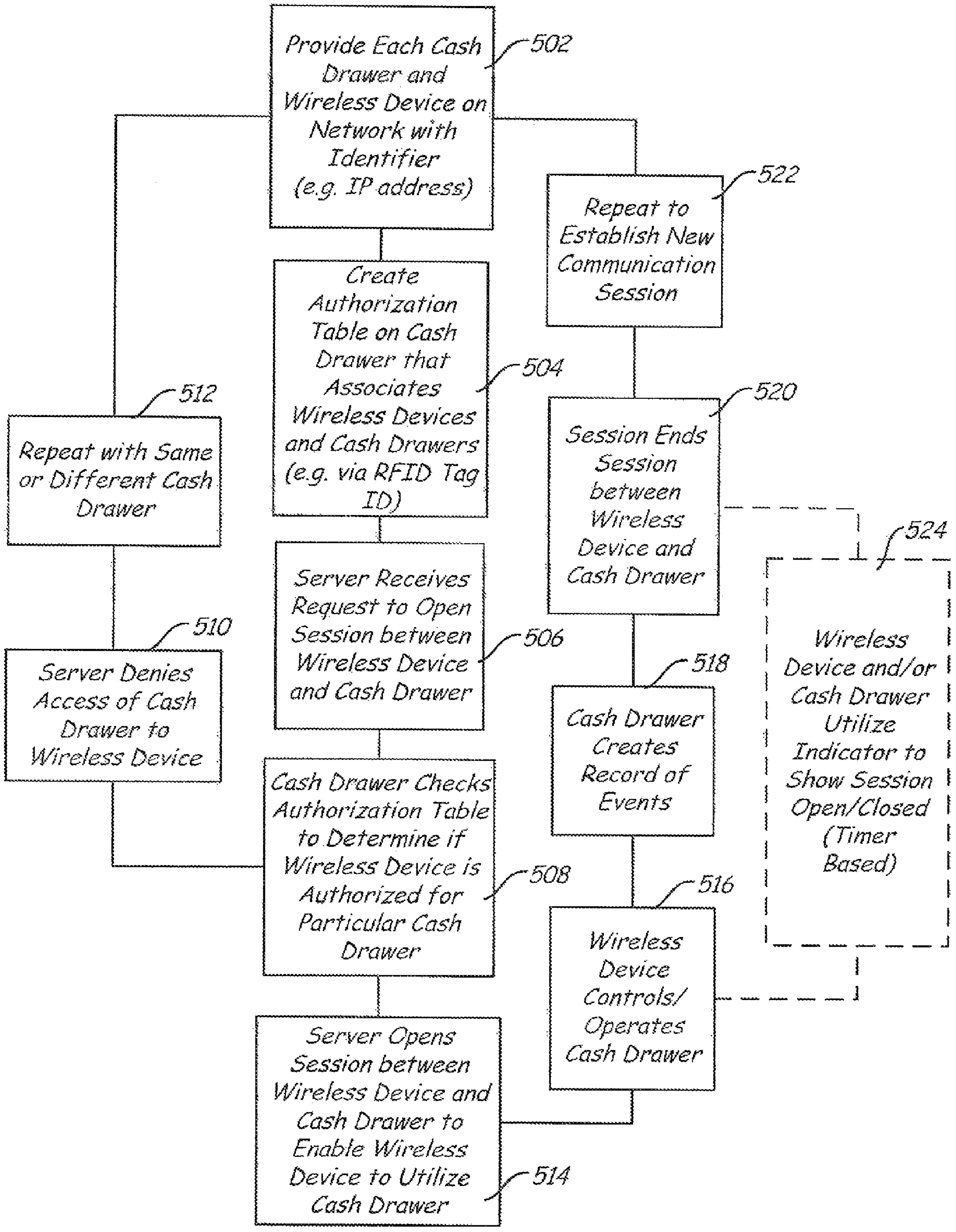
FIG. 5 is a flow chart of a method of enabling a wireless device to operate a cash drawer.

FIG. 5 is a flow diagram illustrating a generalized method of connecting a wireless device to a cash drawer. At block 502, each cash drawer and/or wireless device on a network is provided with a unique identifier (e.g. an IP address). At block 504, an authorization table or other information is created and stored on a cash drawer that identifies which wireless devices are authorized to access which cash drawers (e.g. via RFID tag IDs). At block 506, a server receives a request to open a session between a wireless device and a cash drawer. It should be noted that the request can illustratively come from either a wireless device or a cash drawer. At block 508, the cash drawer checks the authorization table or other stored information to determine if the wireless device is authorized to access the particular cash drawer. If the wireless device is not authorized, the server denies access at block 510. The process may be repeated at block 512 to try to open a session with the same combination of cash drawer and wireless device, or with a different cash drawer and/or wireless device.

If the wireless device is authorized, the server opens a session between the wireless device and the cash drawer at block 514 that enables the wireless device to utilize the cash drawer. At block 516, the wireless device controls/operates the cash drawer, and at block 518, the cash drawer optionally creates and stores a record of events. The server ends the session between the wireless device and the cash drawer at block 520, and the process may be repeated at block 522 to establish a new session between the same wireless device and cash drawer, or to establish a new session between a different combination of a wireless device and a cash drawer. Furthermore, as is illustrated at block 524, one or both of the cash drawer and the wireless device may have indicators (e.g. a light) that identifies when a session between a wireless device and a cash drawer is active. As is indicated in the figure, the session is optionally timer based.

Figure 6:
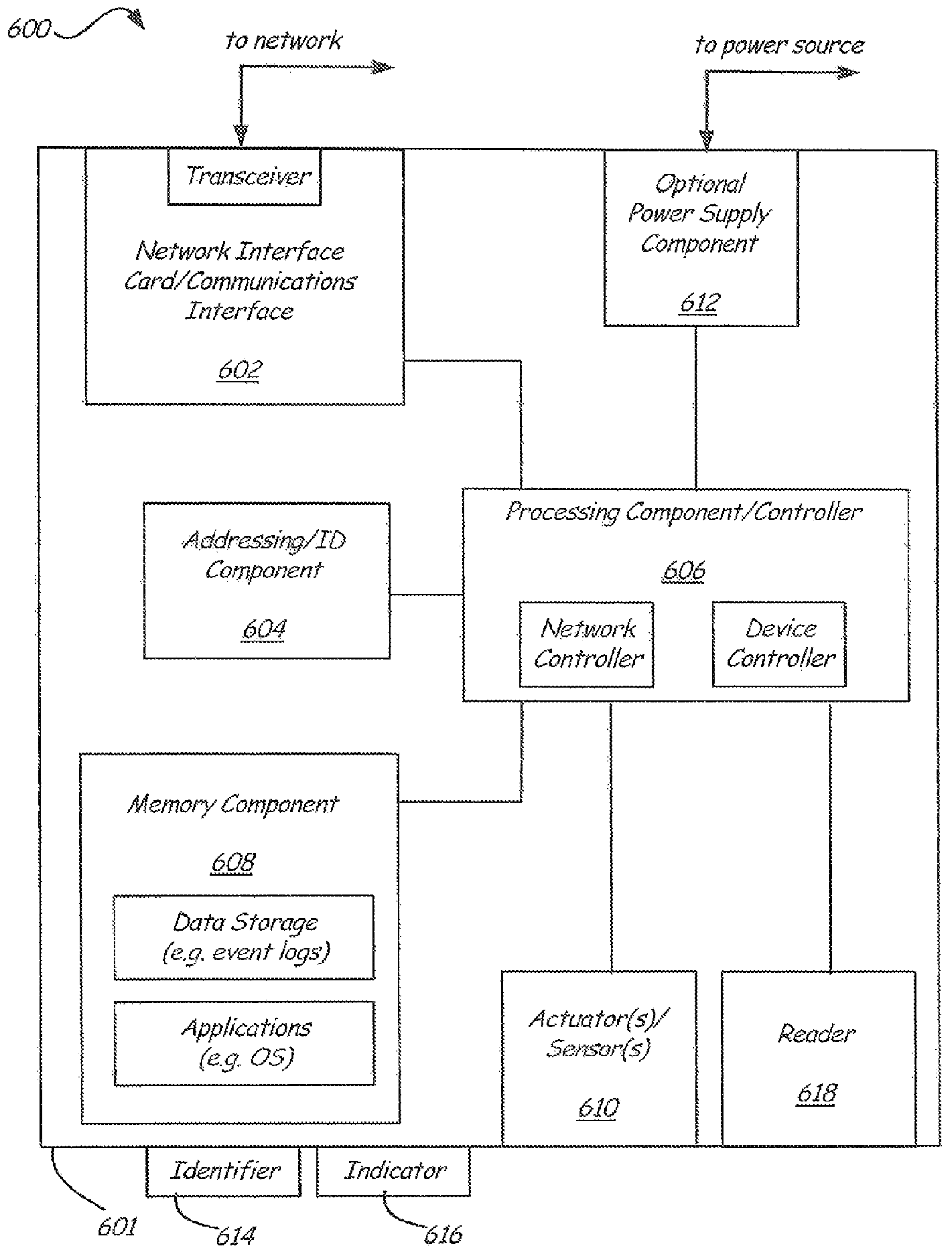
FIG. 6 is a schematic diagram of a cash drawer.

FIG. 6 is a schematic diagram of one example of a cash drawer 600 that may be incorporated within at least certain embodiments. For instance, cash drawer 600 could be utilized as the cash drawer 106 in FIG. 1 or as cash drawer 306 in FIG. 3. Cash drawer 600 optionally includes one or more of a casing or housing 601, a network interface card 602, an addressing component 604, a processing component/controller 606, a memory component 608, an actuator 610, a power supply 612, an identifier 614, an indicator 616, and a reader 618.

Network interface card 602 includes a transceiver that is able to transmit data to and receive data from the network, for example through a network bus such as bus 104 in FIG. 1 or bus 304 in FIG. 3. The transceiver may optionally use either a wired connection or use wireless technology (e.g. a dongle) to connect to the network. In one embodiment, cash drawer 600 communicates utilizing an Ethernet standard. In such a case, cash drawer 600 and other devices connected to the network illustratively send messages in the form of a data packet called a frame. Each frame optionally includes a source device address (e.g. a Media Access Control "MAC" identifier), a destination device address (e.g. a MAC identifier), the data to be transmitted (e.g. the payload data), and a cyclic redundancy check (e.g. a 32-bit cyclic redundancy check) which is used to detect any corruption of data during transit.

Additionally, cash drawer 600 is illustratively able to receive communications from a POS terminal (e.g. wireless devices 108 in FIG. 1 or 308 in FIG. 3) in the form of commands. Some examples of commands, for illustration purposes only and not by limitation, include an open drawer command, a prompt to have the cash drawer return its open/closed status command, a retrieve and clear event logs command, an assign user specific information into a cash drawer asset event log command, a controlled user access command to set a real time clock for date and time stamping of events, and a cash drawer audible and/or visual alerts enable/disable command that optionally enables or disables an audible and/or visual alert. For instance, an audible alert may be set to follow a cash drawer being opened by a POS terminal, a cash drawer being opened with a key, or a cash drawer not being closed after a specified time interval. Also for instance, a visual alert may be set to indicate when a communication session with a POS terminal (e.g. a wireless device) is active. Any other commands may also optionally be included within embodiments.

Addressing/identification component 604 is used in identifying the cash drawer 600 to the network. In one embodiment, addressing component 604 includes a unique serial number that is used to uniquely identify the particular cash drawer from amongst any other device. The unique serial number may be used as part of a Media Access Control (MAC) address scheme utilized by the network. Embodiments of the present disclosure are not however limited to any particular addressing scheme and illustratively include any addressing scheme. Other examples of addressing schemes that may be used include those that use Dynamic Host Configuration Protocol (DHCP) IP address assignment and those that use static IP address assignment/re-assignment.

Processing component/controller 606 illustratively controls the operations of cash drawer 600. In one embodiment, controller 606 includes a network controller portion and a device controller portion. The network controller portion enables the cash drawer to be detected on the network and allows for communications to be transmitted between devices and applications on the network. For instance, the network controller portion receives commands for cash drawer operations and also sends cash drawer information (e.g. log data) to a requesting device and/or application.

The device controller portion stores cash drawer device information and event log entries. The log entries are for example stored in a non-volatile memory to ensure that data is not lost when the drawer is disconnected from the network, powered down, or moved to another network. The device controller portion also monitors an actuator 610 (e.g. a micro-switch) inside the cash drawer that monitors the open/closed status and that provides an electrical pulse that energizes a solenoid to release a latch that allows the cash drawer to be opened. Furthermore, the device controller portion may support auxiliary hardware (e.g. identifier 614, indicator 616, and/or reader 618) that receive or provide feedback of cash drawer operations or status such as, but not limited to, lights (e.g. LEDs) that report status, audible alerts that inform users or managers nearby if the cash drawer has been opened, and/or reading an identifier of a POS terminal (e.g. a wireless device) that is nearby.

Memory component 608 includes any type or combination of memory that may be useful in operation of cash drawer 600. In an embodiment, memory component 608 may include volatile and non-volatile memory. Information that should be retained despite a power loss is illustratively stored to non-volatile memory such as, but not limited to, a magnetic hard disk drive, flash memory, or battery backed DRAM. Some information that may be stored to non-volatile memory includes event log information and applications (e.g. an operating system or POS application).

Optional power supply component 612 facilitates any needed power conditioning, transformation, etc. that may be needed to power the other components of the cash drawer 600. For instance, in a situation in which cash drawer 600 receives power from an external power source (e.g. a 110 volt alternating current wall outlet), power supply component 612 converts the alternating current into one or more direct currents that are fed to the different components of the cash drawer. Similarly, in a situation in which cash drawer 600 receives power from Power over the Ethernet, power supply unit 612 performs any needed conversions/transformations of power so that the cash drawer components receive their electrical requirements.

Optional reader 618 is illustratively a reader such as reader 307 in FIG. 3. Embodiments illustratively include any type of reading and/or scanning device. Some examples include, for illustration purposes only and not by limitation, an RFID reader, a barcode reader, and an NFC reader. The reader 618 may be incorporated within the cash drawer in any possible configuration. For instance, the reader 618 may have an antenna that is completely enclosed by the housing 601, that is partially or completely exposed through an aperture in housing 601, or that is partially or completely exposed through a window in housing 601. Embodiments again are not limited to any particular configuration, and include any configuration.

Optional identifier 614 is illustratively an identifier such as identifier 107 in FIG. 1, and optional indicator 616 is illustratively an indicator such as indicator 305 in FIG. 3. As discussed previously, identifier 614 may include any type of audio, visual, or other identifier such as, but not limited to, a barcode, an RFID tag, or an NFC chip. Indicator 616 may include any type of audio, visual, or other indicator such as, but not limited to, a light (e.g. one or more LEDs) or a speaker (e.g. an alarm speaker). The identifier 614 and/or indicator 616 may be utilized in connecting a wireless device to a cash drawer as is shown in the flow diagrams in FIGS. 2, 4, and 5.

Figure 7:
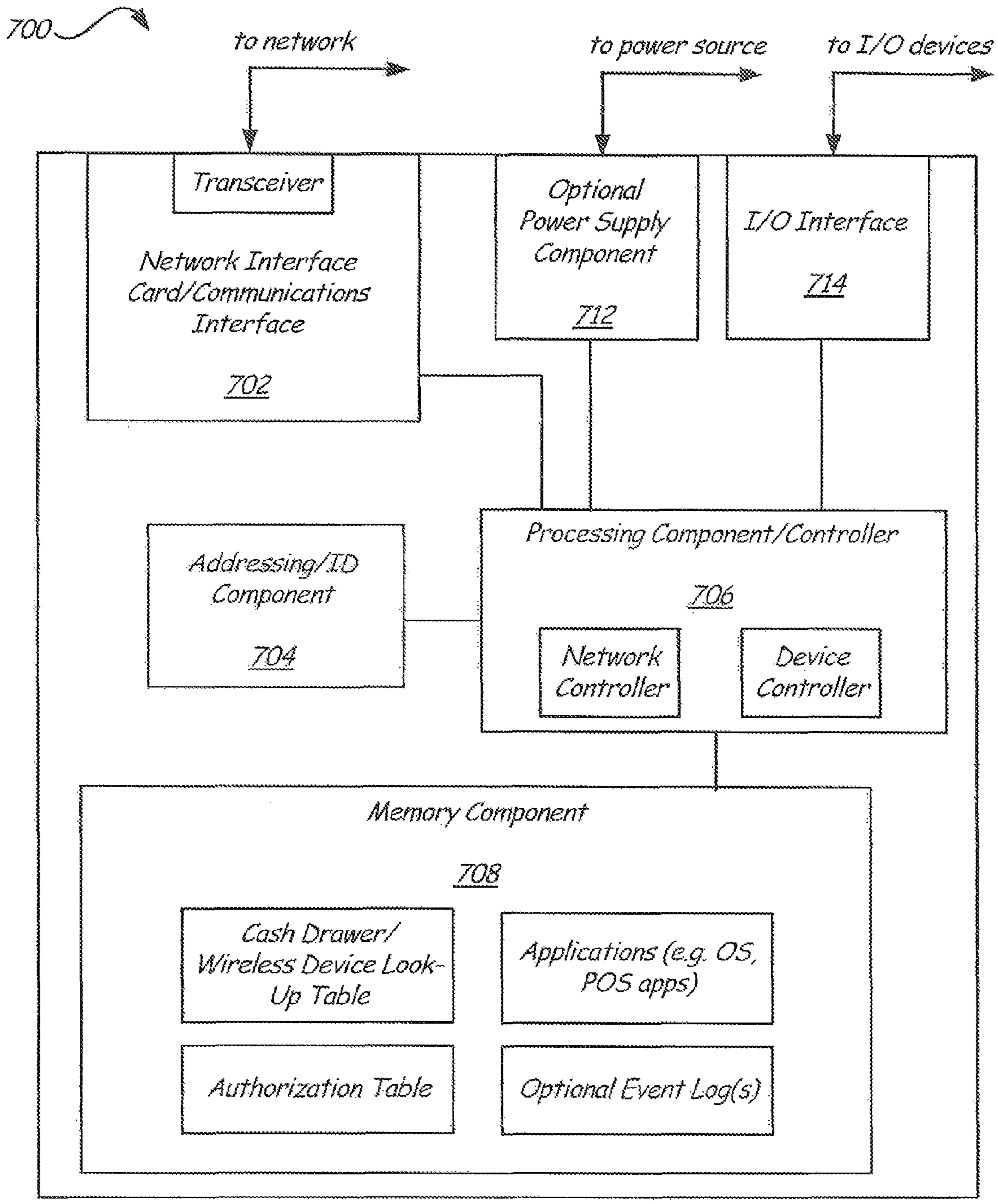
FIG. 7 is a schematic diagram of a server.

FIG. 7 is a schematic diagram of one example of a server 700 that may be incorporated within at least certain embodiments. For instance, server 700 could be utilized as the server 102 in FIG. 1 or as server 302 in FIG. 3. Server 700 optionally includes one or more of a network interface card 702, an addressing component 704, a processing component/controller 706, a memory component 708, a power supply 712, and an I/O interface 714.

Similar to the cash drawer network interface card 602 in FIG. 6, the server network interface card 702 includes a transceiver that is able to transmit data to and receive data from the network, for example through a network bus such as bus 104 in FIG. 1 or bus 304 in FIG. 3. The transceiver may optionally use either a wired connection or use wireless technology (e.g. a dongle) to connect to the network. In one embodiment, server 700 communicates in an Ethernet standard that utilizes messages in the form of data packets called frames.

Addressing/identification component 704 is used in identifying the server 700 to the network. In one embodiment, addressing component 704 includes a unique serial number that is used to uniquely identify the server from amongst any other device. The unique serial number may be used as part of a Media Access Control (MAC) address scheme utilized by the network. Embodiments of the present disclosure are not however limited to any particular addressing scheme and illustratively include any addressing scheme. Other examples of addressing schemes that may be used include those that use Dynamic Host Configuration Protocol (DHCP) IP address assignment and those that use static IP address assignment/re-assignment.

Processing component/controller 706 illustratively controls the operations of server 700. In one embodiment, controller 706 enables the server to establish a network that allows for communications to be transmitted between devices and applications on the network. For instance, controller 706 may send commands to cash drawers and also receive cash drawer information (e.g. log data) from any cash drawer on its network.

Memory component 708 includes any type or combination of memory that may be useful in operation of server 700. In an embodiment, memory component 708 may include volatile and non-volatile memory. Information that should be retained despite a power loss is illustratively stored to non-volatile memory such as, but not limited to, a magnetic hard disk drive, flash memory, or battery backed DRAM.

FIG. 7 illustrates some example of data/information that may be stored to memory component 708. For instance, memory component 708 may have a look-up table that enables the server 700 to identify a particular cash drawer and/or wireless device given a particular identifier (e.g. an identifier read from a barcode, RFID tag, or NFC chip).

Memory component 708 may have an authorization table or other information that identifies which wireless devices are authorized to access which cash drawers. Memory component 708 may further have event log information that is pulled form one or more cash drawers, and/or application data used to run an operating system, the network, a POS application, and any other needed or desirable program.

Optional power supply component 712 facilitates any needed power conditioning, transformation, etc. that may be needed to power the other components of the server 700. For instance, in a situation in which server 700 receives power from an external power source (e.g. a 110 volt alternating current wall outlet), power supply component 712 converts the alternating current into one or more direct currents that are fed to the different components of the server. Similarly, in a situation in which server 700 receives power from Power over the Ethernet, power supply unit 712 performs any needed conversions/transformations of power so that the cash drawer components receive their electrical requirements.

Input/output (I/O) interface 714 enables server 700 to receive and output information to external devices such as, but not limited to, a keyboard, mouse, touchscreen, monitor, printer, trackball, etc. This enables a user to interact with server 700 to perform functions such as setting-up the network, programming or configuring any cash drawer parameters (e.g. session duration), reviewing event logs, and any other functions that may be desirable.

Figure 8:
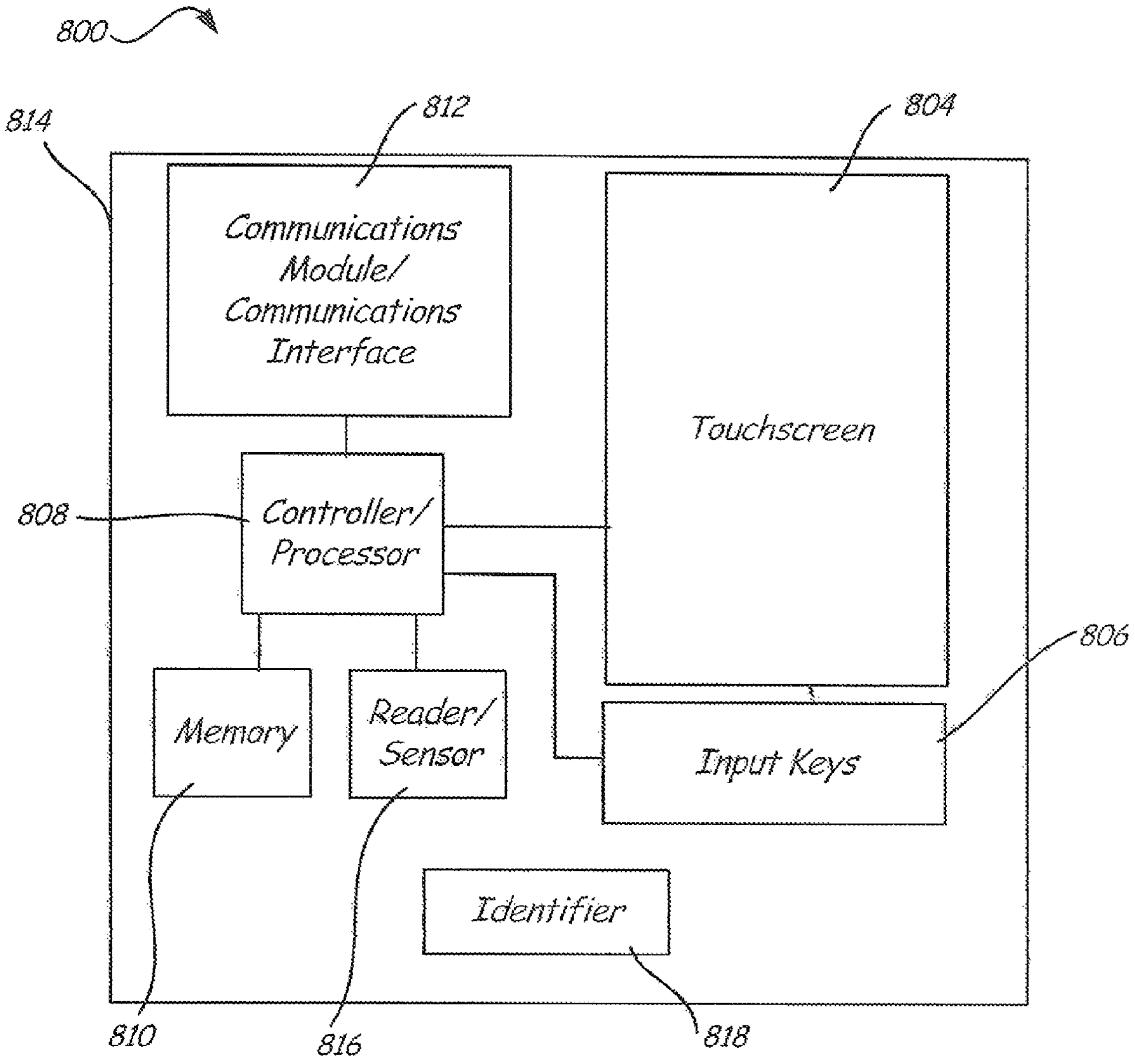
FIG. 8 is a schematic diagram of a wireless device.

FIG. 8 is a schematic diagram of one example of a POS terminal/wireless device 800 that may be incorporated within at least certain embodiments. For instance, wireless device 800 could be utilized as the wireless device 108 in FIG. 1 or as wireless device 308 in FIG. 3. Some examples of specific implementations of a wireless device 800 include devices such as, but not limited to tablet computers (e.g. Apple iPad, Motorola Xoom), smartphones (e.g. Apple iPhone, HTC Evo), digital music players/mp3 players (e.g. Apple iPod Touch), personal digital assistants, netbooks, and laptop computers. Embodiments are not however limited to any particular type or configuration of digital control input mechanism and may be implemented utilizing devices different than the one shown in the figure.

Wireless device 800 optionally includes one or more of a touchscreen 804, input keys 806, a controller/processor 808, memory 810, a communications module/communications interface 812, a housing/case 814, reader(s)/sensor(s) 816, and an identifier 818. Touchscreen 804 illustratively includes any type of single touch or multitouch screen (e.g. capacitive touchscreen, vision based touchscreen, etc.). Touchscreen 804 is able to detect a user's finger, stylus, etc. contacting touchscreen 804 and generates input data (e.g. x and y coordinates) based on the detected contact. Input keys 806 include buttons or other mechanical devices that a user is able to press or otherwise actuate to input data. For instance, input keys 806 may include a home button, a back button, 0-9 number keys, a QWERTY keyboard, etc.

Memory 810 includes volatile, non-volatile or a combination of volatile and non-volatile memory. Memory 810 may be implemented using more than one type of memory. For example, memory 810 may include any combination of flash memory, magnetic hard drives, RAM, etc. Memory 810 stores the computer executable instructions that are used to implement the POS/cash drawer systems described above. Memory 810 may also store user saved data such as profile settings and/or content downloaded from a cloud network.

Controller/processor 808 can be implemented using any type of controller/processor (e.g. ASIC, RISC, ARM, etc.) that can process user inputs and the stored instructions to generate commands for controlling systems such as, but not limited to, POS/cash drawer systems. The generated commands, etc. are sent to communications module/communications interface 814 that transmits the commands to the controlled systems. For instance, interface 814 may send commands to one or more cash drawers through a connection to a network bus (e.g. network bus 104 in FIG. 1 or bus 304 in FIG. 3).

The controller housing 814 can be any suitable housing. In one embodiment, housing 814 has a form factor such that wireless device 800 is able to fit within a user's hand. Housing 814 may however be larger (e.g. tablet sized) and is not limited to any particular form factor.

Wireless device 800 further optionally includes one or more readers and/or sensors 816 and one or more identifiers 818. Reader(s)/sensor(s) 816 can include any combination of one or more readers or sensors. Some examples of readers/sensors include, for illustration purposes only and not by limitation, a photographic and/or video camera, an RFID reader, a NFC reader, a proximity sensor, a barcode reader/scanner, a motion sensor (e.g. an accelerometer), a light sensor, a GPS receiver, a temperature sensor (e.g. a thermocouple), and a biometric sensor. Identifiers 818 similarly can include any combination of one or more identifiers. Some example of identifiers include, for illustration purposes only and not by limitation, an active or passive RFID tag, a barcode (e.g. one or two-dimensional barcode), and an NFC chip. Additionally, identifiers 818 may be embedded within the wireless device housing 814 or attached to the outside of the housing 814.

FIG. 9 is an illustration of one embodiment of an event log that is generated by a cash drawer and is stored to its memory (e.g. non-volatile memory). Any information that is useful for maintaining, troubleshooting, or managing cash drawers may be stored in an event log. In the specific example shown in FIG. 9, the event log includes a date indicator 904, a time indicator 906, an event identifier 908, an event status identifier 910, and a wireless device identifier 912. Event identifier 908 is illustratively a code that corresponds to a cash drawer event. Some cash drawer events that may be identified include a cash drawer open by a POS command, a cash drawer open by a manual actuation (e.g. by a key), a cash drawer close, a length of time a cash drawer remains open, a connection or disconnection between a cash drawer and a network, a power supply (e.g. DC adaptor) power up or power down, audible alert activations, etc. Event status identifier 910 may identify a status of an event such as successful, unsuccessful, unknown, or any other status that may be required or useful. Wireless device identifier 912 illustratively stores an indication of a wireless device associated with the event. For example, identifier 912 could identify which one of multiple wireless devices on a network open a cash drawer.

Figure 10:
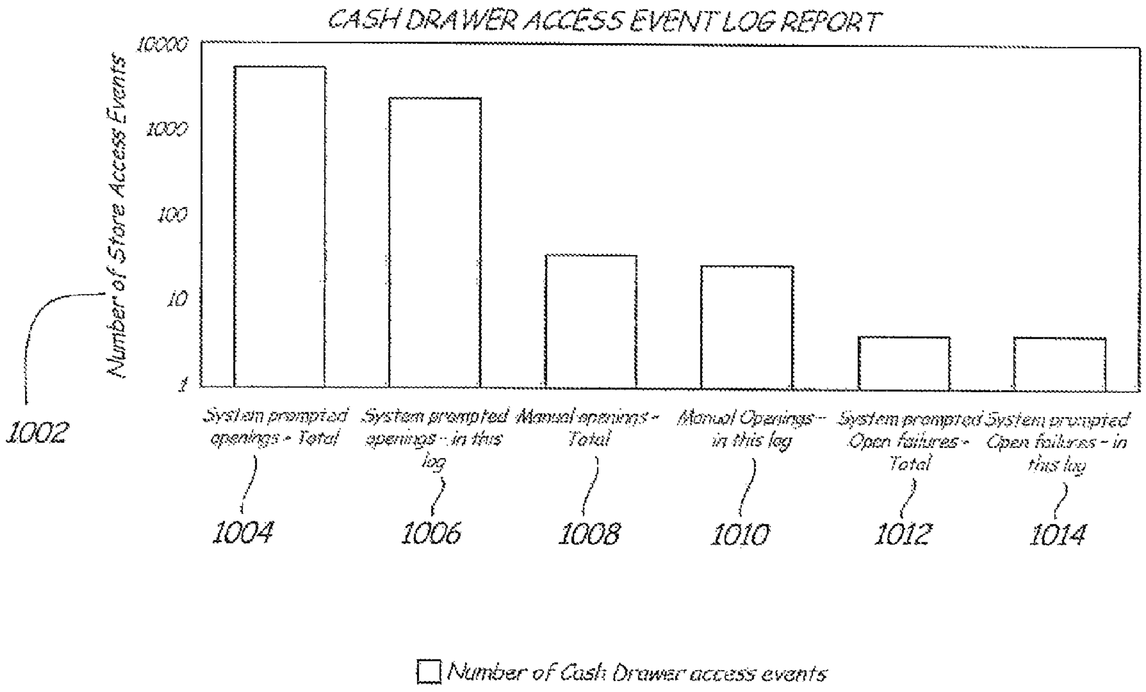
FIG. 10 is a user interface displaying cash drawer statistics.

In an embodiment, one or more devices (e.g. wireless devices and/or network servers) connected to a cash drawer are able to retrieve and process event logs from cash drawers. For instance, a device may be able to perform and display statistics of a cash drawer. FIG. 10 shows one example of a user interface displaying statistics calculated for a cash drawer. In particular, FIG. 10 shows a "Cash Drawer Access Event Log Report." The vertical or y-axis includes a number of access events 1002, and the horizontal or x-axis includes a description of an event. In the particular example shown in FIG. 10, the events along the horizontal axis include a total number of system prompted openings 1004, a number of system prompted openings in this log 1006, a total number of manual openings 1008, a number of manual openings in this log 1010, a total number of open failures for system prompted openings 1012, and a number of open failures for system prompted openings in this log 1014.

Figure 11:
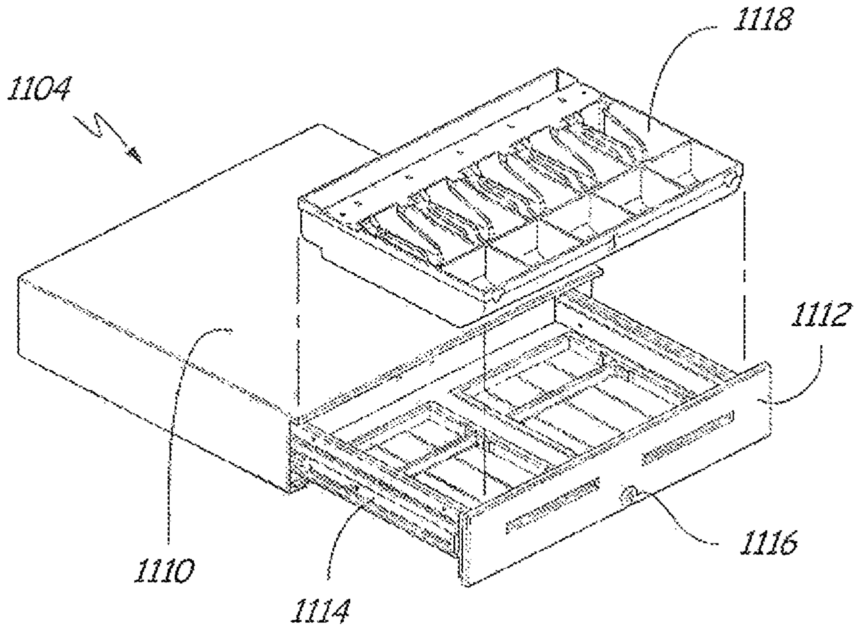
FIG. 11 is a perspective view of a cash drawer.
Figure 12:
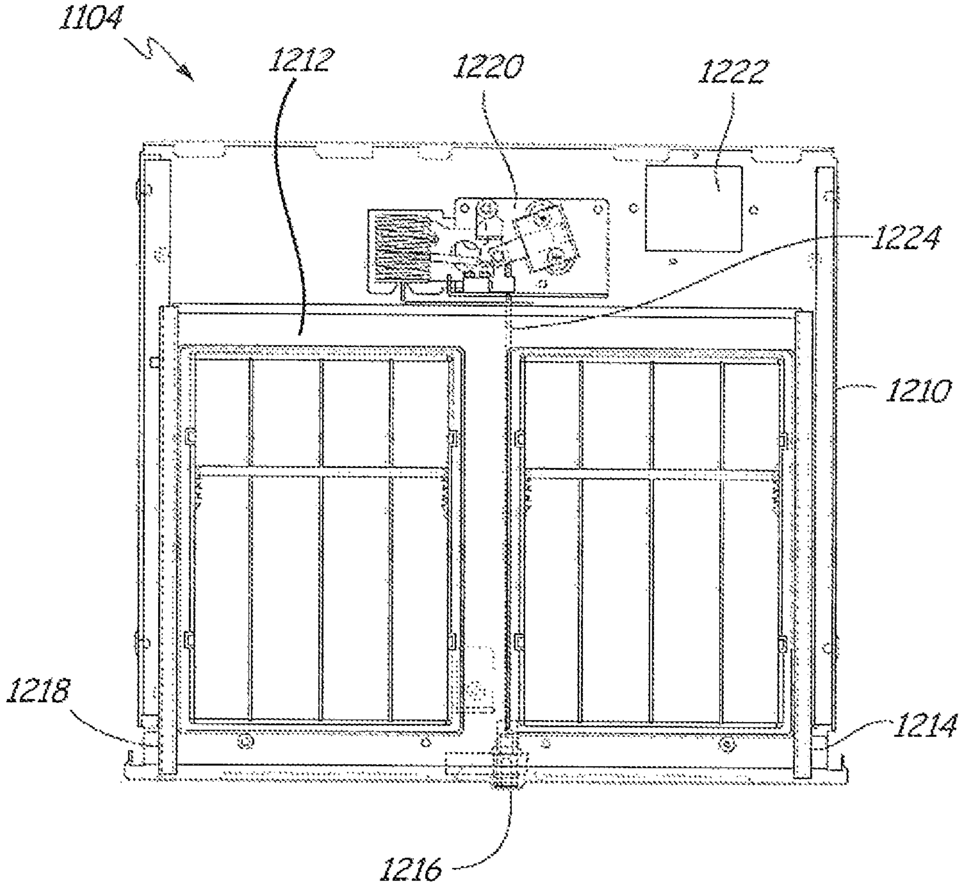
FIG. 12 is a top down view of the cash drawer of FIG. 11 with the top of the housing and the till having been removed.

FIGS. 11 and 12 show an example of a cash drawer 1104 that may be used in some embodiments. Embodiments of the present disclosure are not however limited to any particular type of cash drawer, and embodiments illustratively include cash drawers having any configuration. FIG. 11 is a perspective view of cash drawer 1104. FIG. 11 shows that cash drawer 1104 includes a drawer housing 1110, a movable drawer 1112, a set of slides 1114 that enable drawer 1112 to move into and out of housing 1110, a manual open/close mechanism 1116 (e.g. a key lock), and a removable till 1118 for holding currency, receipts, etc.

FIG. 12 shows a top down view of cash drawer 1104 with the top of the housing 1110 and the till 1118 having been removed. FIG. 12 shows that cash drawer 1104 also includes a latch bracket assembly 1220 for opening/closing the movable drawer 1212 and an electrical circuit board 1222 having one or more electrical components for operating the drawer. For example, electrical circuit board 1222 may include one or more of the electrical components shown in FIG. 6. Other embodiments of cash drawers 1104 may include multiple circuit boards 1222 and/or circuit boards with different locations (e.g. beneath movable drawer 1212). FIG. 12 further shows that cash drawer 1104 includes a lock rod 1224 that connects the manual open/close mechanism 1216 to the latch bracket assembly 1220. Lock rod 1224 is illustratively used to release the latch within latch bracket assembly 1220 to move drawer 1212 into an open position.

Figure 13:
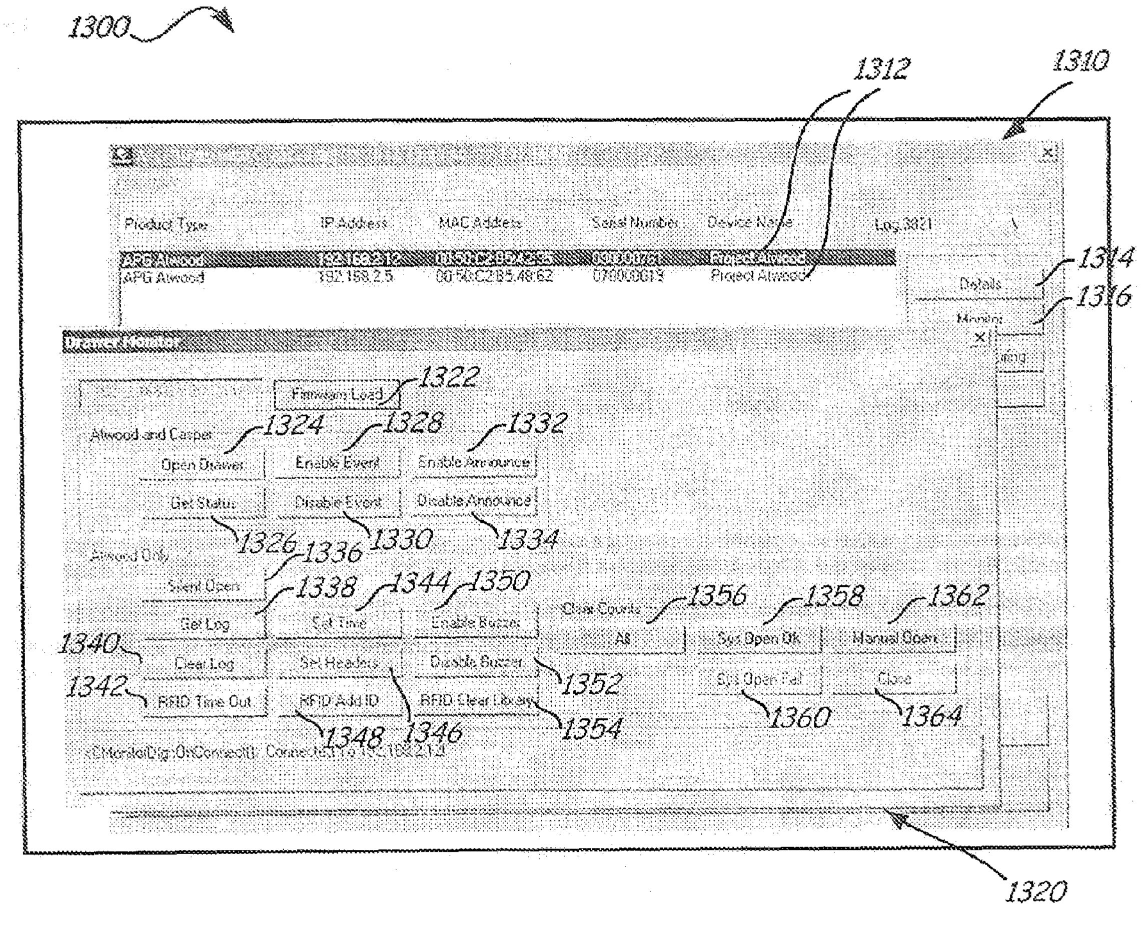
FIG. 13 is an illustration of a user interface for configuring a cash drawer.
Figure 14:
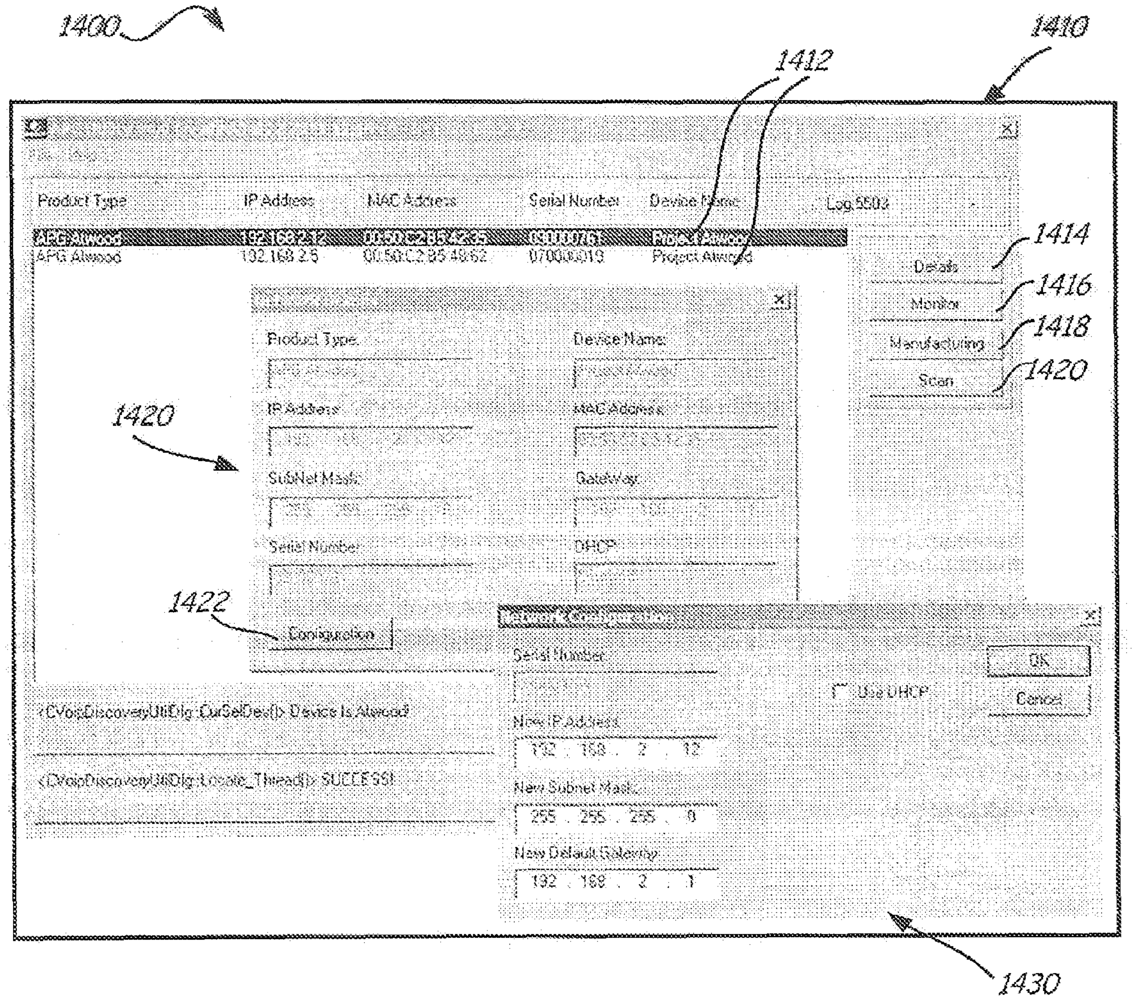
FIG. 14 is an illustration of another user interface for configuring a cash drawer.

FIGS. 13 and 14 show examples of two user interfaces that may be used to set parameters associated with a wireless device operable cash drawer. The user interfaces can be viewed and utilized on any computing device. The user interfaces for example could be included within a wireless device (e.g. device 108 in FIG. 1 or 308 in FIG. 3) and/or a server (e.g. server 102 in FIG. 1 or 302 in FIG. 3).

FIG. 13 shows a user interface 1300 having two windows 1310 and 1320. Window 1310 illustratively shows each of the cash drawers connected to the network. Each cash drawer is displayed as a selectable line 1312 that may be highlighted/selected. Window 1312 may also include a details button 1314 and a monitor button 1316. A user may select one of the cash drawer lines 1312 and then press button 1314 to view details of the cash drawer, or press button 1316 to monitor the cash drawer.

Window 1320 shows one example of a monitor window. Window 1320 includes a number of different buttons that can be selected to view details, perform actions, set parameters, and perform other functions associated with a cash drawer. Some examples of buttons that may be included are a firmware load button 1322, an open drawer button 1324, a get status button 1326, an enable event button 1328, a disable event button 1330, an enable announce button 1332, a disable announce button 1334, a silent open button 1336, a get log button 1338, a clear log button 1340, an RFID time out button 1342, a set time button 1344, a set headers button 1346, an RFID add ID button 1348, an enable buzzer button 1350, a disable buzzer button 1352, an RFID clear library button 1354, a clear all counts button 1356, a system open okay button 1358, a system open fail button 1360, a manual open button 1362, and a close button 1364.

FIG. 14 shows a user interface 1400 having three windows 1410, 1420, and 1430. Window 1410 is illustratively the same or similar to window 1310 in FIG. 13. Window 1410 displays user selectable lines 1412 that enable a user to select one of the cash drawers on the network. Window 1410 also includes a details button 1414, a monitor button 1416, a manufacturing button 1418, and a scan button 1419.

Network details window 1420 illustratively shows a number of network parameters associated with a selected cash drawer. For example, window 1420 may show information about a cash drawer's product type, IP address, subnet mask, serial number, device name, MAC address, gateway, and DHCP. Window 1420 may also include a configuration button 1422.

Network configuration window 1430 is illustratively displayed (e.g. pops-up) after button 1422 in window 1420 is selected. Window 1430 may include fields that allow a user to enter cash drawer parameters such as, but not limited to, a serial number, a new IP address, a new subnet mask, and a new gateway. Window 1430 may also include a button/field 1432 that enables a user to enable/disable DHCP. Window 1430 may further include an okay button 1434 and a cancel button 1436 to either close the window with saving entered information or to close the window without saving any entered information.

In some of the embodiments described above, systems have used identifiers based on barcode, RFID, and/or NFC technologies. In other embodiments, systems may utilize biometric information. For example, an operator can be authenticated to a system utilizing voice, face, fingerprint, eye, or any other type of biometric information.

Figure 15:
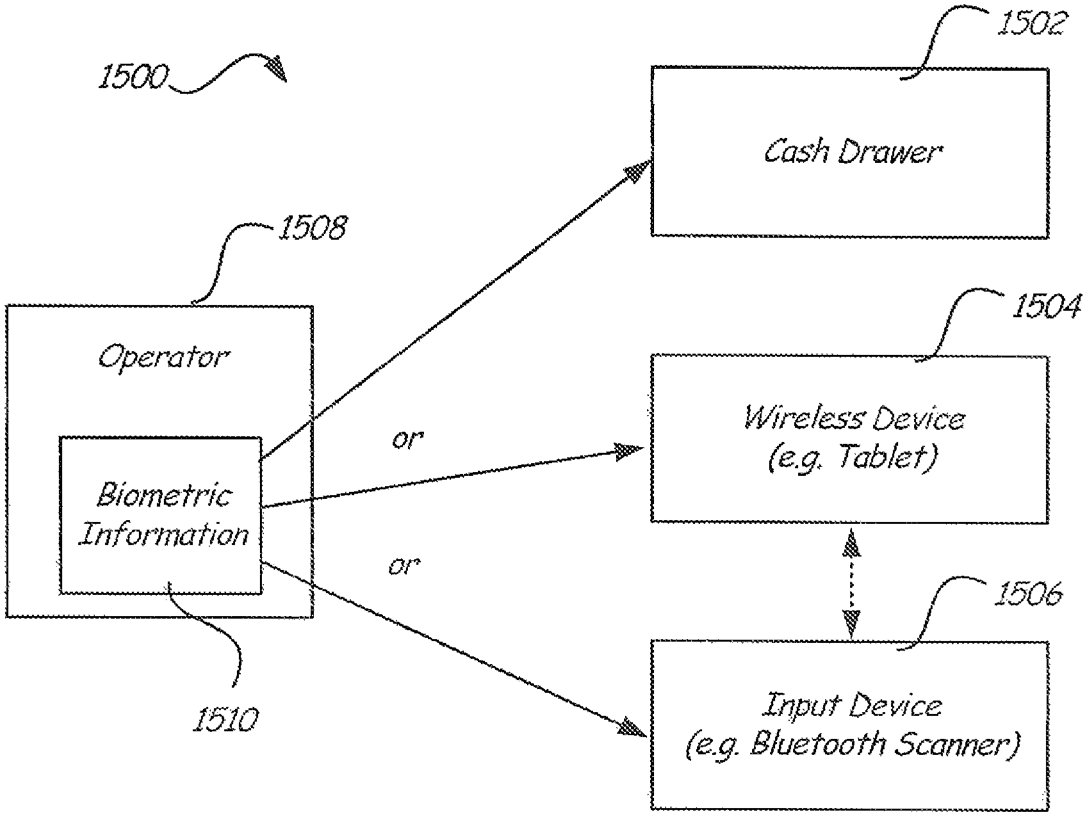
FIG. 15 is a schematic diagram of a cash drawer system that utilizes biometric information.

FIG. 15 shows a schematic diagram of a system 1500 that optionally utilizes biometric information. System 1500 includes one or more cash drawers 1502, one or more wireless devices 1504 (e.g. a tablet computer), and one or more input devices 1506. In certain embodiments of this disclosure, a wireless device 1504 is connected (e.g. wired or wirelessly) to another input device 1506. For example, a wireless device 1504 may be wirelessly connected to a Bluetooth scanner 1506 that can be used to read barcode, RFID, NFC, and/or biometric identifiers. Accordingly, in certain situations, wireless device 1504 does not directly read an identifier, but instead indirectly reads an identifier utilizing an input device 1506.

In FIG. 15, an operator 1508 (e.g. a person who wants to access a cash drawer) has one or more sources of biometric information 1510. The operator 1508 illustratively utilizes the cash drawer 1502, the wireless device 1504, and/or the input device 1506 to submit a collection of biometric information to the system 1500. For instance, the cash drawer 1502, the wireless device 1504, and/or the input device 1506 may have a biometric scanner that can collect biometric information from the operator 1508.

Once the biometric information is collected, the system 1500 then utilizes the biometric information to determine the identity of the operator 1508. If the operator 1508 is one of the persons who is authorized to utilize cash drawer 1502, the operator 1508 is granted access to the cash drawer 1502 upon a successful verification of his or her identity. If the operator 1508 is not one of the persons who is authorized to utilize cash drawer 1502, the operator 1508 is denied access to the cash drawer 1502.

Figure 16:
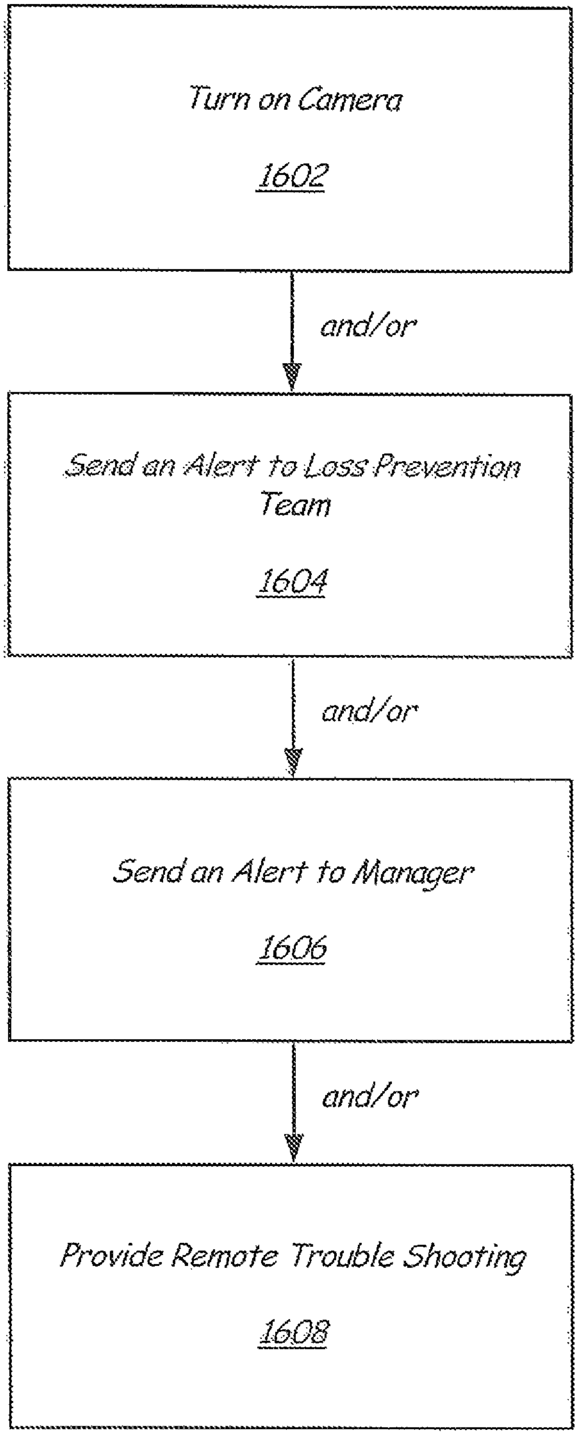
FIG. 16 is a schematic diagram of messaging and other capabilities that may be provided by a cash drawer.

A cash drawer may have more capabilities beyond its ability to respond to a wireless device. For instance, a cash drawer can send messages to other IP devices that are connected to the same network through either a wired or a wireless connection. FIG. 16 is a schematic diagram of some of the capabilities that may be included within a cash drawer. At block 1602, a cash drawer sends a message to turn on a camera based on the occurrence of some predetermined criteria. For example, a cash drawer may send a message to turn on a camera upon the cash drawer being opened with a key. At block 1604, a cash drawer sends a message (e.g. an alert message) to a loss prevention team to review camera information at a specific time. At block 1606, a cash drawer sends a message (e.g. an alert message) to a manager's personal computer or wireless device, and at block 1608, a cash drawer utilizes its network connectivity to provide for remote trouble shooting capabilities.

Figure 17:
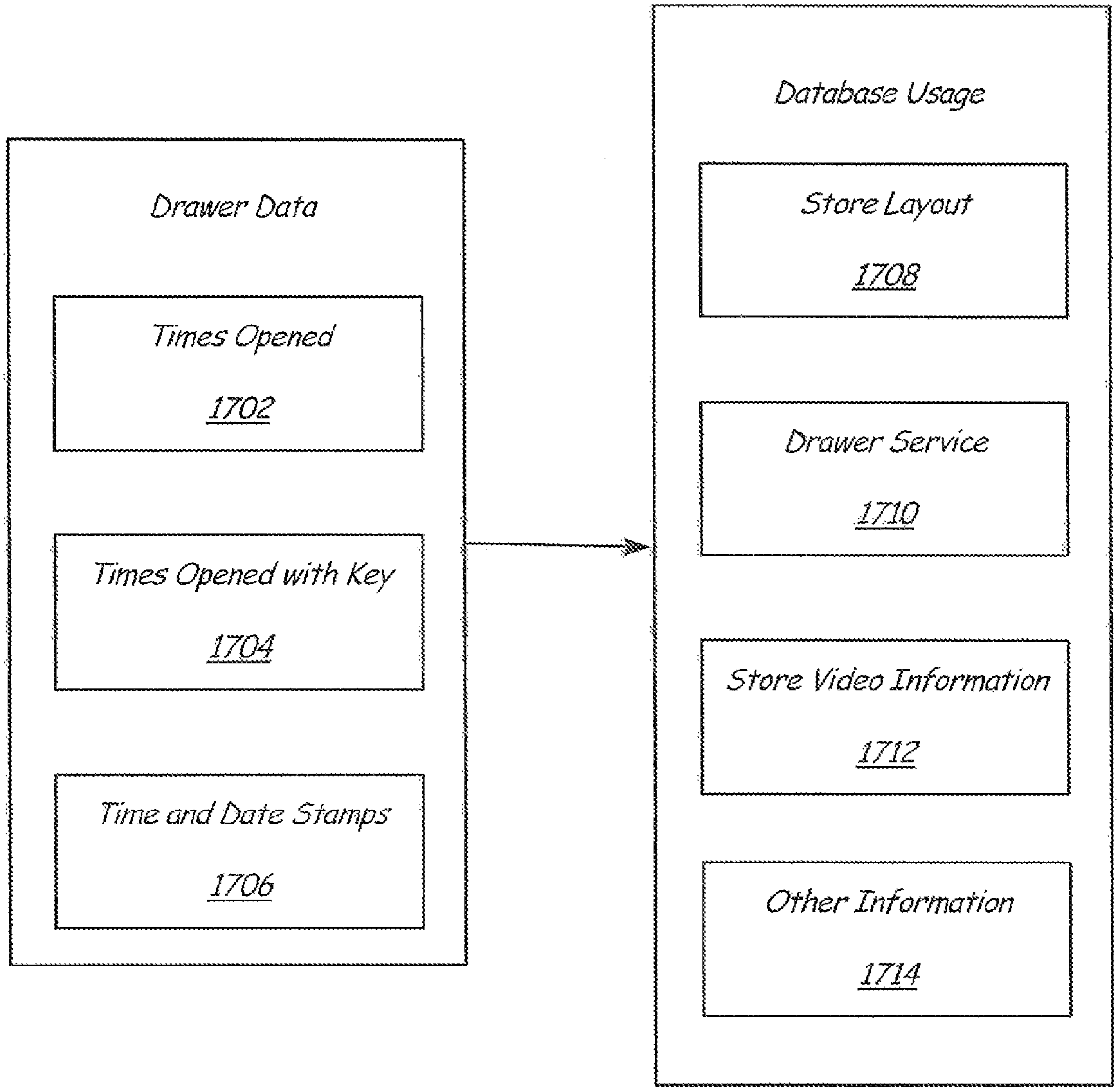
FIG. 17 is a schematic diagram of methods of utilizing a cash drawer database.

FIG. 17 shows some potential uses for a cash drawer database. In certain embodiments, a cash drawer database can be parsed to determine drawer usage information such as, but not limited to, how many times a drawer has been opened 1702, how many times a drawer has been opened with a key 1704, and a time and date stamp of every transaction 1706. The drawer information can then be used to determine a store layout 1708 (e.g. should a drawer be relocated for better access), whether or not a drawer needs to be service based on a number of cycles 1710, where on a store video certain events are located 1712 (e.g. a person opening the drawer with a key), and any other information that is desired 1714.

As has been discussed above, embodiments of the present disclosure include cash drawers that are operable by a wireless device. In some embodiments, multiple cash drawers and wireless devices are communicatively coupled through a network (e.g. an Ethernet network), and each cash drawer and wireless device is optionally a separate device or node on the network that has its own IP address. In such a case, a wireless device is able to selectively connect to a particular cash drawer on the network. For instance, in one particular embodiment, for illustration purposes only and not by limitation, each cash drawer on a network has a barcode, and a wireless device reads the barcode of one of the cash drawer to become communicatively coupled to that cash drawer. In some other embodiments, again for illustration purposes only, cash drawers and wireless devices utilize other technologies such as, but not limited to, radio frequency identification (RFID), near field communication (NFC), and biometric technologies to selectively couple a wireless device to a cash drawer. These cash drawers may be advantageous in that they provide mobile point-of-sale (POS) systems and low cost cash management solutions.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A cash drawer comprising:

a network interface through which the cash drawer communicates with a wireless device, wherein communicating comprises sending a message through the network interface to the wireless device;

a controller that controls the ability of the wireless device to directly access the cash drawer through the network interface based on a collection of biometric information, wherein the controlled access is made contingent upon validation of the collected biometric information, wherein the biometric information is provide from the wireless device, and wherein direct access comprises a direct connection between the wireless device and the cash drawer over the network; and a command receiver configured to receive and comply with commands received from the wireless device, wherein compliance is made contingent upon a multi-factor recognition scheme comprising at least validation of the collected biometric information and recognition of the wireless device as an authorized device.

2. The cash drawer of claim 1, wherein the collection of biometric information is collected by the wireless device.

3. The cash drawer of claim 1, wherein the collection of biometric information is collected by an input device that is communicatively coupled to the wireless device.

4. The cash drawer of claim 1, wherein the collection of biometric information is utilized to verify an identity of a user.

5. A cash drawer comprising:

a network interface through which the cash drawer communicates with a network, wherein the network comprises at least one other device; and a controller through which the cash drawer sends messages to the at least one other device utilizing the network, and wherein sending messages comprising the cash drawer directly communicating with the at least one other device, and wherein the at least one other device is an authorized device, and wherein direct access comprises a direct connection between the other device and the cash drawer over the network, and wherein the authorized device is a device authorized by the controller.

6. The cash drawer of claim 5, wherein the cash drawer sends a message to turn on a camera.

7. The cash drawer of claim 6, wherein the message to turn on the camera is generated upon a key being used to open the cash drawer.

8. The cash drawer of claim 5, wherein the cash drawer sends a message to a loss prevention team.

9. The cash drawer of claim 8, wherein the message to the loss prevention team provides an indication of a specific time to review camera information.

10. The cash drawer of claim 5, wherein the cash drawer sends a message to a manager's personal computer or wireless device.

11. The cash drawer of claim 5, wherein the controller enables remote troubleshooting of the cash drawer.

12. The cash drawer of claim 5, wherein the cash drawer is configured to receive inputs from another device.

13. The cash drawer of claim 12, wherein the another device is a Bluetooth scanner.

14. A method comprising:

communicatively coupling a cash drawer to a network; and storing indications of transactions associated with the cash drawer to a database accessible over the network, wherein the transactions comprise a set of actions involving interactions with the cash drawer taking place directly between the cash drawer and an authorized individual, and wherein the indications of transactions are sent directly from the cash drawer to the database, and wherein directly comprises a direct connection between the authorized individual and the cash drawer over the network, and wherein the authorized individual is an individual authenticated by the cash drawer.

15. The method of claim 14, wherein the indications of transactions include a count of how many times the cash drawer has been opened.

16. The method of claim 14, wherein the indications of transactions include a count of how many times the cash drawer has been opened with a key.

17. The method of claim 14, wherein the indications of transactions include a time stamp and a date stamp of each of the transactions.

18. The method of claim 14, and further comprising: utilizing the database to determine a store layout at least in part based on a frequency of transactions using the cash drawer.

19. The method of claim 14 and further comprising: utilizing the database to determine whether or not the cash drawer should be serviced based at least in part on a current count of transactions since the cash drawer was last serviced.

20. The method of claim 14, and further comprising: utilizing the database to determine where on a video a specific event can be found.

21. The method of claim 20, wherein the specific event is a person opening the cash drawer with a key.

* * * * *